US010374658B2

(12) United States Patent
Tanji

(10) Patent No.: US 10,374,658 B2
(45) Date of Patent: Aug. 6, 2019

(54) COMMUNICATION SYSTEM, COMMUNICATION APPARATUS, METHOD OF CONTROLLING THE SAME, AND STORAGE MEDIUM

(71) Applicant: CANON KABUSHIKI KAISHA, Tokyo (JP)

(72) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 14/841,954

(22) Filed: Sep. 1, 2015

(65) Prior Publication Data

US 2016/0072553 A1 Mar. 10, 2016

(30) Foreign Application Priority Data

Sep. 4, 2014 (JP) ................................ 2014-180493

(51) Int. Cl.
*H04B 5/00* (2006.01)
*H04N 1/00* (2006.01)
(Continued)

(52) U.S. Cl.
CPC ......... *H04B 5/0031* (2013.01); *G06F 3/1204* (2013.01); *G06F 21/34* (2013.01);
(Continued)

(58) Field of Classification Search
CPC combination set(s) only.
See application file for complete search history.

(56) References Cited

U.S. PATENT DOCUMENTS

2012/0208461 A1 8/2012 Choi et al.
2013/0016710 A1* 1/2013 Shinohara ........... H04M 1/7253 370/338

(Continued)

FOREIGN PATENT DOCUMENTS

JP 2001344407 A 12/2001
JP 2004038733 A 2/2004

(Continued)

OTHER PUBLICATIONS

Japanese Office Action dated Mar. 3, 2017 in corresponding Japanese Patent Application No. 2014180493 with English translation, 5 pages.

(Continued)

*Primary Examiner* — Zhitong Chen
(74) *Attorney, Agent, or Firm* — Carter, DeLuca & Farrell LLP

(57) ABSTRACT

A technique by which it is possible to prevent a user inputting mistake from occurring when writing, from a communication apparatus (communication terminal) to a wireless communication tag (NFC tag), connection information for connecting to a printing apparatus (image forming apparatus) is provided. The image forming apparatus converts connection information for connecting to the image forming apparatus by a WLAN scheme into a corresponding image pattern, and displays the image pattern on a display unit. A communication terminal photographs the image pattern displayed on the display unit by a camera. The communication terminal restores the corresponding connection information from the image pattern photographed by the camera, and generates NDEF data based on the restored connection information. The communication terminal writes the generated NDEF data to the NFC tag by NFC communication.

32 Claims, 10 Drawing Sheets

(51) Int. Cl.

| | |
|---|---|
| ***H04W 4/80*** | (2018.01) |
| ***H04M 1/725*** | (2006.01) |
| ***G06F 3/12*** | (2006.01) |
| ***G06F 21/34*** | (2013.01) |
| ***G06Q 20/34*** | (2012.01) |
| ***H04L 9/32*** | (2006.01) |

(52) U.S. Cl.

CPC ......... *G06Q 20/355* (2013.01); *H04L 9/3226* (2013.01); *H04M 1/7253* (2013.01); *H04N 1/00334* (2013.01); *H04W 4/80* (2018.02)

(56) References Cited

U.S. PATENT DOCUMENTS

| | | | | | |
|---|---|---|---|---|---|
| 2013/0031623 | A1* | 1/2013 | Sanders | G06F 21/34 | 726/19 |
| 2013/0141567 | A1* | 6/2013 | Walker | H04M 1/7253 | 348/135 |
| 2013/0146659 | A1* | 6/2013 | Zhou | G06Q 20/355 | 235/380 |
| 2013/0299570 | A1* | 11/2013 | Ting | G06F 3/1204 | 235/375 |
| 2014/0376721 | A1* | 12/2014 | Perez | H04L 9/3226 | 380/270 |
| 2015/0079982 | A1* | 3/2015 | Wu | H04W 4/001 | 455/435.1 |
| 2016/0054962 | A1* | 2/2016 | Park | H04L 41/0806 | 358/1.15 |

FOREIGN PATENT DOCUMENTS

| | | | |
|---|---|---|---|
| JP | 2008-287627 | A | 11/2008 |
| JP | 2011-155593 | A | 8/2011 |
| JP | 2013-184296 | A | 9/2013 |
| JP | 2013-196511 | A | 9/2013 |
| WO | 2013/127124 | A1 | 9/2013 |

OTHER PUBLICATIONS

Japanese Office Action dated Sep. 3, 2018 in corresponding Japanese Patent Application No. 2017-151031, with English translation.

* cited by examiner

COMMUNICATION SYSTEM, COMMUNICATION APPARATUS, METHOD OF CONTROLLING THE SAME, AND STORAGE MEDIUM

BACKGROUND OF THE INVENTION

Field of the Invention

The present invention relates to a communication system, a communication apparatus, a method of controlling the same, and a storage medium.

Description of the Related Art

In recent years, image forming apparatuses having wireless communication functions supporting various wireless communication standards such as NFC (Near Field Communication), wireless LAN, Bluetooth®, or the like, have appeared. Techniques for easily causing such an image forming apparatus to execute a print (image formation) from a communication terminal such as a smart phone that supports NFC have been proposed. For example, Japanese Patent Laid-Open No. 2013-184296 discloses an image forming apparatus that exchanges information with a communication terminal in order to establish communication according to a higher speed communication scheme such as wireless LAN by establishing NFC communication with the communication terminal when it is detected that the communication terminal is positioned within range for the NFC communication. The image forming apparatus establishes communication according to the high speed communication scheme with the communication terminal using information that was exchanged, and receives print data from the communication terminal by the established communication to perform printing. The technique for thus performing a pairing between apparatuses by NFC communication and handing over the actual communication to Bluetooth® or wireless LAN communication is called "a handover".

One method of realizing the handover described above is a method of the image forming apparatus providing connection information, for connecting to an access point to which the image forming apparatus is connected by a high speed communication scheme such as wireless LAN, to a communication terminal by an NFC communication. In this method, the communication terminal establishes a wireless connection with the access point using the connection information received by the NFC communication, and establishes communication with the image forming apparatus via the access point.

In connection information that is exchangeable in such NFC communication, an SSID (Service Set Identifier) that indicates unique identification information for identifying an access point on a wireless network may be included. Also, in this kind of connection information, information such as an authentication method, an encryption method, an encryption key, or the like, that are used by the access point may be included. This kind of connection information is stored in advance as NDEF (NFC Data Exchange Format) data in an NFC module of the image forming apparatus. With this, the NFC module of the communication terminal is able to execute a handover based on NDEF data that is read by reading NDEF data from the NFC module of the image forming apparatus by an NFC communication.

While on one hand image forming apparatuses in which an NFC module is implemented exist in recent years, as described above, there are still many image forming apparatuses in existence in which an NFC module is not implemented. In image forming apparatuses in which such an NFC module is not implemented, an NFC tag in which connection information necessary for a handover is written may be attached to an external surface of the image forming apparatus. With this, an external communication terminal can execute the above described handover using the NFC tag attached to the external surface of the image forming apparatus.

As described above, when realizing a handover using an NFC tag, it is necessary to write connection information necessary for the handover to the NFC tag in advance. The writing of the connection information to the NFC tag can be performed using a communication terminal that has an NFC communication function (NFC module), for example. In such a case, it is necessary for a user to input the above described connection information, such as the SSID, manually using a communication terminal, and in addition to the input being cumbersome for the user, there is the possibility that an inputting mistake will occur.

SUMMARY OF THE INVENTION

The present invention was conceived in view of the above described issues. The present invention provides a technique by which it is possible to prevent a user inputting mistake from occurring when writing connection information for connecting to a printing apparatus (image forming apparatus) from a communication apparatus (communication terminal) to a wireless communication tag (NFC tag).

According to one aspect of the present invention, there is provided a communication system including a printing apparatus and a communication apparatus, wherein the printing apparatus comprises: a display unit configured to display a bar code indicating wireless setting information that is necessary for communicating with the printing apparatus, and the communication apparatus comprises: a reading unit configured to read the bar code displayed by the display unit; a generation unit configured to generate connection information necessary to communicate with the printing apparatus based on the wireless setting information, which is obtained from the bar code; and a writing unit configured to write the connection information generated by the generation unit to a wireless communication tag using a short-range wireless communication.

According to another aspect of the present invention, there is provided a communication apparatus capable of writing information to a wireless communication tag, the apparatus comprising: a reading unit configured to read a bar code displayed by an external apparatus; a generation unit configured to generate connection information to be written to the wireless communication tag based on information obtained from the bar code; and a writing unit configured to write the connection information generated by the generation unit to the wireless communication tag using a short-range wireless communication.

According to still another aspect of the present invention, there is provided a method of controlling a communication apparatus capable of writing information to a wireless communication tag using a short-range wireless communication, the method comprising: generating connection information to be written to the wireless communication tag based on information obtained by the communication apparatus reading a bar code displayed by an external apparatus; and controlling the communication apparatus to write the connection information generated in the generating to the wireless communication tag using the short-range wireless communication.

According to yet another aspect of the present invention, there is provided a non-transitory computer-readable storage medium storing a computer program for causing a computer to execute a method of controlling a communication apparatus capable of writing information to a wireless communication tag using a short-range wireless communication, the method comprising: generating connection information to be written to the wireless communication tag based on information obtained by the communication apparatus reading a bar code displayed by an external apparatus; and controlling the communication apparatus to write the connection information generated in the generating to the wireless communication tag using the short-range wireless communication.

By virtue of the present invention, it is possible to prevent a user inputting mistake from occurring when writing connection information for connecting to a printing apparatus (image forming apparatus) from a communication apparatus (communication terminal) to a wireless communication tag (NFC tag).

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Communication System Configuration>

Figure 1:
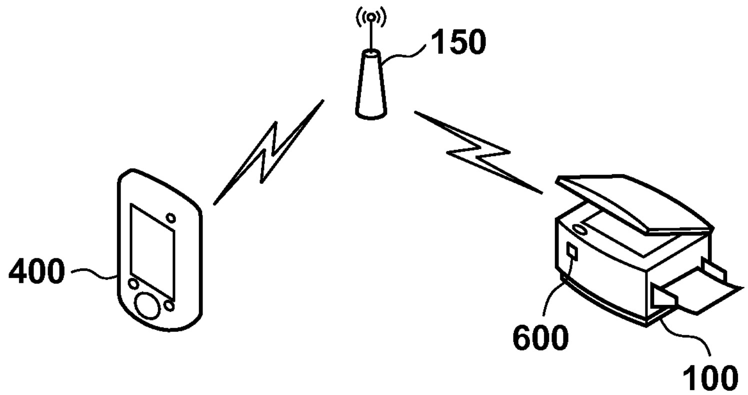
FIG. 1 is a view for illustrating an example configuration of a communication system.

FIG. 1 is a view for illustrating an example configuration of a communication system in accordance with an embodiment. This communication system includes at least an image forming apparatus 100, an access point 150, a communication terminal 400, and an NFC (Near Field Communication) tag 600. The access point 150 is an access point for communication according to a wireless LAN scheme (wireless LAN communication). The communication terminal 400 is a portable information processing terminal; for example, a mobile terminal or a notebook PC. Note that in this communication system, any number of the image forming apparatus 100 and the communication terminal 400 respectively may be included. The NFC tag 600 is attached to the image forming apparatus 100 by being affixed to a surface of the image forming apparatus 100 (an external surface) by a seal. Note that the NFC tag 600 is only an example of a wireless communication tag, and that the wireless communication tag corresponds to a wireless tag (an RF tag) such as an NFC tag, an RFID tag, an IC tag, or the like, for which writing and reading of information from an external apparatus is possible.

The image forming apparatus 100 and the communication terminal 400 include communication interfaces (I/F) for communication of a wireless LAN (WLAN) scheme, which is an example of a (second) communication scheme for which a communication rate is of a higher speed that a (first) communication scheme for a short-range wireless communication (short-range wireless communication) such as NFC. The image forming apparatus 100 and the communication terminal 400 are both capable of performing a wireless connection by WLAN communication to the access point 150. The image forming apparatus 100 is normally in a state in which it is wirelessly connected to the access point 150 as a client by WLAN communication. On the other hand, the communication terminal 400 is capable of communicating with the image forming apparatus 100 via the access point 150 by wirelessly connecting to the access point 150. However, the communication terminal 400 is not necessarily being in the state in which it is wirelessly connected to the access point 150.

The communication terminal 400 supports NFC, which is an example of a communication scheme for short-range wireless communication, and is capable of communicating with the NFC tag 600 by NFC communication. In the present embodiment, the communication terminal 400 can obtain, as connection information for connecting to the image forming apparatus 100, connection information for connecting to the access point 150 by the WLAN scheme from the NFC tag 600 by NFC communication. Furthermore, the communication terminal 400 can perform a handover from the NFC communication to the WLAN communication by establishing WLAN communication with the access point 150 using the connection information obtained from the NFC tag 600.

<Image Forming Apparatus Configuration>

Figure 2:
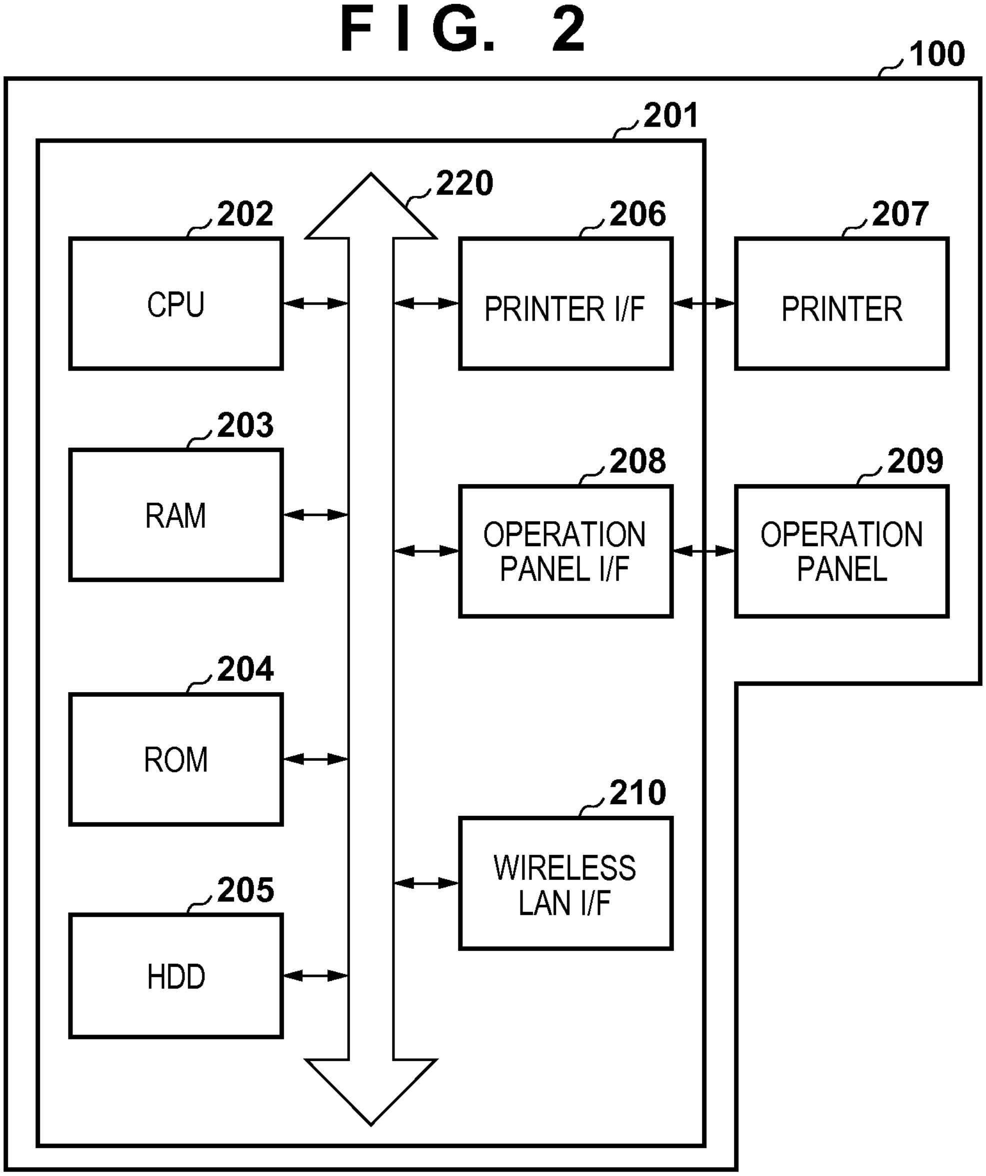
FIG. 2 is a block diagram for showing an example of a hardware configuration of an image forming apparatus.

FIG. 2 is a block diagram for showing an example of a hardware configuration of the image forming apparatus 100. The image forming apparatus 100 includes a control unit 201, a printer (printer engine) 207 and an operation panel 209 that are connected to the control unit 201. The control unit 201 controls overall operations of the image forming apparatus 100. The control unit 201 includes a CPU 202, a RAM 203, a ROM 204, a hard disk drive (HDD) 205, a printer interface (I/F) 206, an operation panel I/F 208, and a wireless LAN I/F 210, which are devices connected to a system bus 220.

The RAM 203 is used as a temporary storage area such as a work area, a main memory, or the like, of the CPU 202. In the ROM 204, control programs of the image forming apparatus 100 are stored. The CPU 202 controls overall operations of the image forming apparatus 100 by controlling the devices connected via the system bus 220. More specifically, the CPU 202 performs various control in the image forming apparatus 100 such as communication control, and control of image formation (printing) by reading control programs stored in the ROM 204 or the HDD 205 into the RAM 203 and executing the control programs. The HDD 205 is used for the saving of various data and programs.

The printer I/F 206 is an interface for connecting the printer 207 and the control unit 201. The printer I/F 206, in addition to outputting image signals to the printer 207, outputs control signals from the CPU 202 to the printer 207. The printer 207, in accordance with a control signal from the CPU 202, executes processing for printing onto a sheet that is fed from a feed cassette (not shown) based on an image signal input from the printer I/F 206.

The operation panel I/F 208 is an interface for connecting the operation panel 209 and the control unit 201. The operation panel 209 (FIG. 7) includes a liquid crystal display unit, having a touch panel function, a keyboard, or the like.

The wireless LAN I/F 210 performs WLAN communication with an external apparatus via an antenna for wireless LAN (not shown). The wireless LAN I/F 210 is capable of performing WLAN communication with the access point 150, for example. In such a case, the wireless LAN I/F 210 is able to perform communication via the access point 150 with an external apparatus (the communication terminal 400, etc.) connected to the access point 150. Also, the wireless LAN I/F 210 may be capable of executing communication by Wi-Fi Direct® which is one WLAN scheme. In such a case, the wireless LAN I/F 210 can perform a Wi-Fi Direct communication with an external apparatus (the communication terminal 400, or the like) which is directly connected by Wi-Fi Direct. Note that in the present specification "Wi-Fi Direct communication" is included in "wireless LAN (WLAN) communication".

The CPU 202 is capable of communicating with an external apparatus such as the communication terminal 400, or the like, by WLAN communication via the wireless LAN I/F 210, and may transmit various information to an external apparatus, and also may receive various information from an external apparatus. For example, the CPU 202 receives print data from an external apparatus via the wireless LAN I/F 210, and the printer 207 executes processing for printing based on the print data that is received.

Note that while in the present embodiment, as an example, a state in which the single CPU 202 controls operation of the image forming apparatus 100 using a single memory (the RAM 203) is illustrated, it is possible to change to another situation. For example, a plurality of CPUs and a plurality of memories may be caused to coordinate. Also, the image forming apparatus 100 may include a wired LAN I/F, and may be connected to the access point 150 via the wired LAN I/F and a wired network. In such a case, the image forming apparatus 100 can communicate with an external apparatus, such as the communication terminal 400, via the access point 150 which is connected to the wired LAN I/F.

Figure 3:
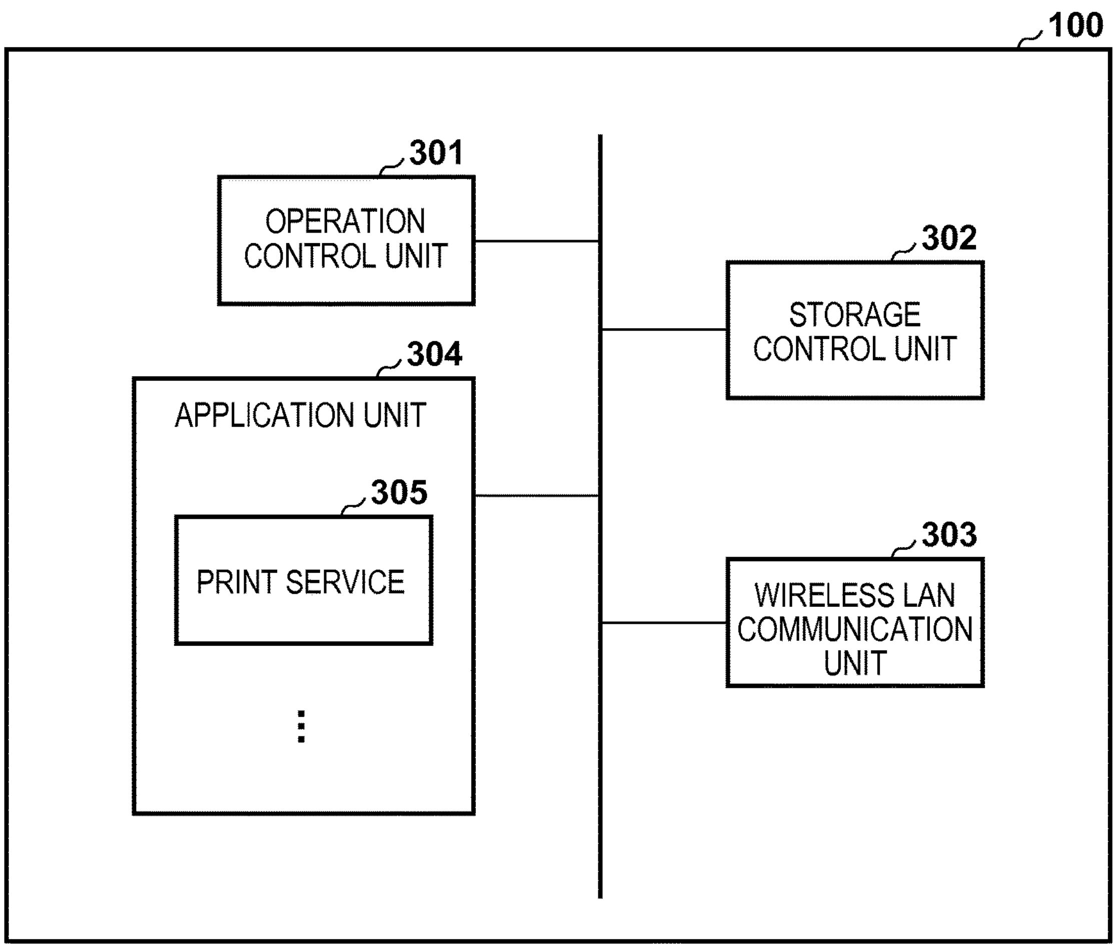
FIG. 3 is a block diagram for showing an example of a software configuration of the image forming apparatus.

FIG. 3 is a block diagram for showing an example of a software configuration of the image forming apparatus 100. Each functional unit shown in FIG. 3 is realized on the image forming apparatus 100 by the CPU 202 reading a control program stored in the ROM 204 or the HDD 205 into the RAM 203 and executing the control program.

An operation control unit 301 controls operation of the operation panel 209. The operation control unit 301 causes operation screens to be displayed on the operation panel 209, and also accepts an input of an instruction by a user via an operation screen displayed on the operation panel 209, for example. The operation control unit 301 notifies another functional unit of an instruction of a user accepted via the operation panel 209, and also updates an operation screen displayed on the operation panel 209 in accordance with the accepted instruction of the user. A storage control unit 302 stores designated data in the RAM 203 or the HDD 205 in accordance with an instruction from another functional unit, or reads designated data from the RAM 203 or the HDD 205.

A wireless LAN communication unit 303 controls a WLAN communication executed by the wireless LAN I/F 210. An application (APP) unit 304 is comprised of a plurality of APP services such as a print service 305. Note that the APP unit 304 may further include APP services other than that of the print service 305. The print service 305 receives via the wireless LAN communication unit 303 print data that is transmitted from an external apparatus such as the communication terminal 400 and, via the printer I/F 206, and causes the printer 207 to execute printing based on the received print data.

<Communication Terminal Configuration>

Figure 4:
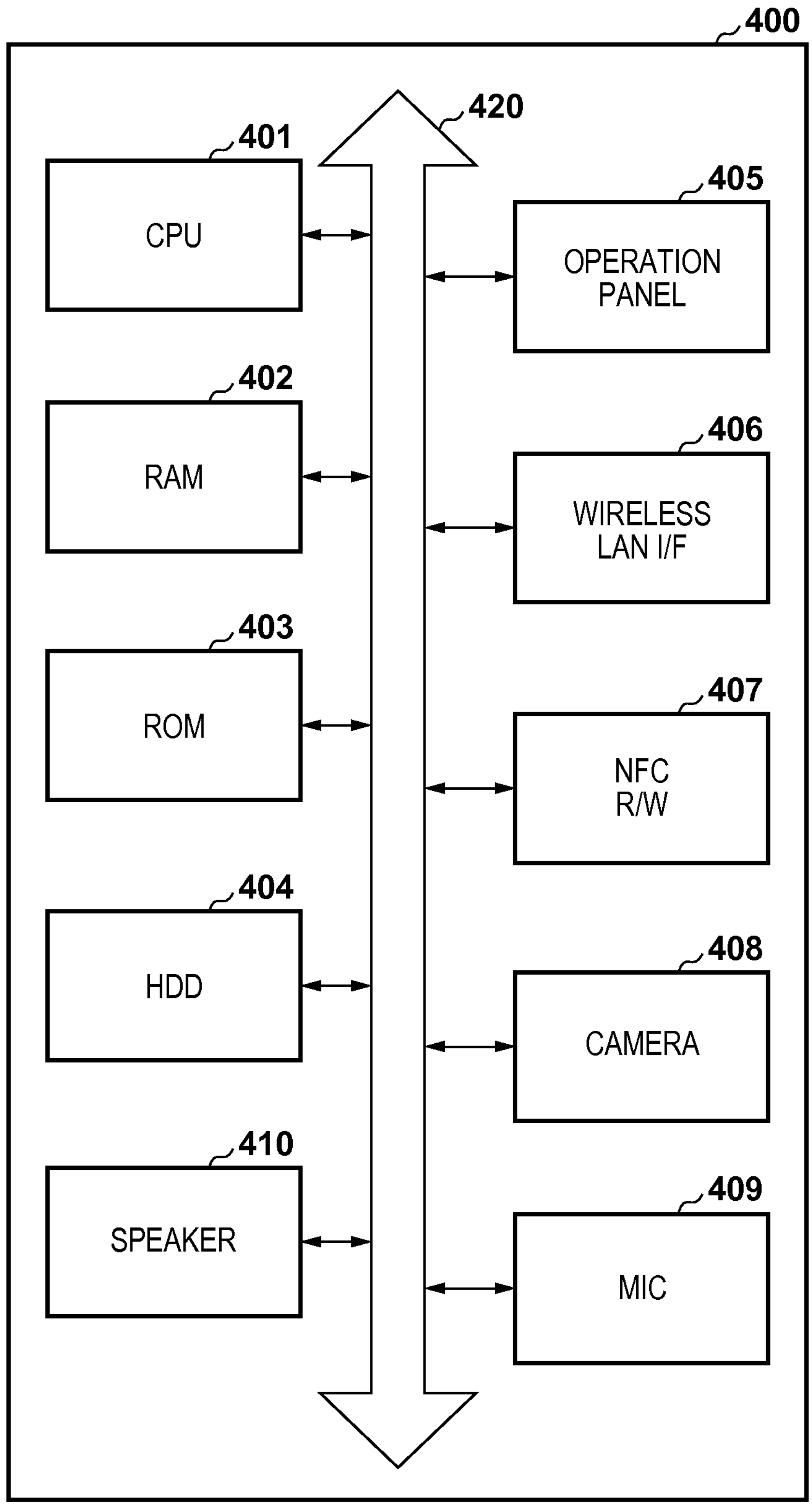
FIG. 4 is a block diagram for showing an example of a hardware configuration of a communication terminal.

FIG. 4 is a block diagram for showing an example of a hardware configuration of the communication terminal 400. The communication terminal 400 includes a CPU 401, a RAM 402, a ROM 403, an HDD 404, an operation panel 405, a wireless LAN I/F 406, an NFC reader/writer (NFC R/W) 407, a camera 408, a mic 409, and a speaker 410, which are devices that are connected to a system bus 420.

The RAM 402 is used as a temporary storage area such as a work area, a main memory, or the like, of the CPU 401. In the ROM 403, control programs of the communication terminal 400 are stored. The CPU 401 controls overall operations of the communication terminal 400 by reading a control program stored in the ROM 403 into the RAM 402 and executing the control program. The HDD 404 is used for the saving of various data and programs and an information table.

The operation panel 405 displays various screens such as an operation screen. The operation panel 405 has a touch panel function, and is capable of accepting a touch operation by a user. A user is able to perform a touch operation (a gesture operation) such as a drag operation, a flick operation, or the like, by using the touch panel function in accordance with the display of the operation panel 405, and is able to input various instructions into the communication terminal 400.

The wireless LAN I/F 406 performs WLAN communication with an external apparatus via an antenna for the wireless LAN (not shown). The wireless LAN I/F 406 is capable of performing WLAN communication with the access point 150, for example. In such a case, the wireless LAN I/F 406 is able to perform communication via the access point 150 with an external apparatus (the image forming apparatus 100, etc.) connected to the access point 150. Also, the wireless LAN I/F 406 may be capable of executing Wi-Fi Direct communication. In such a case, the wireless LAN I/F 406 can perform a Wi-Fi Direct communication with an external apparatus (the image forming apparatus 100, or the like) which is directly connected by Wi-Fi Direct.

The CPU 401 is capable of communicating with an external apparatus such as the image forming apparatus 100, or the like, by WLAN communication via the wireless LAN I/F 406, and may transmit various information to an external apparatus, and also may receive various information from an external apparatus. For example, the CPU 401 can transmit image data stored in a memory such as the RAM 402 or the HDD 404 via the wireless LAN I/F 406, as print data, in the image forming apparatus 100.

The NFC R/W 407 is capable of executing an NFC communication with an NFC tag such as the NFC tag 600. The NFC R/W 407 performs writing of NDEF data to the NFC tag 600 and reading of NDEF data that is written to the NFC tag 600 by NFC communication.

The camera 408 includes a lens for photographing that is built into the communication terminal 400, and a control device therefor, and the camera 408 is capable of photographing moving images and still images. The mic 409 accepts input of audio of a user when the user calls the user of another communication terminal using the communication terminal 400, and converts the audio into an electrical signal. The speaker 410 outputs an audio signal received from another communication terminal as audio in a case where the communication terminal 400 performs a call to the other communication terminal.

Note that while in the present embodiment, as an example, a state in which the single CPU 401 controls operation of the communication terminal 400 using a single memory (the RAM 402) is illustrated, it is possible to change to another situation. For example, a plurality of CPUs and a plurality of memories may be caused to coordinate.

Figure 5:
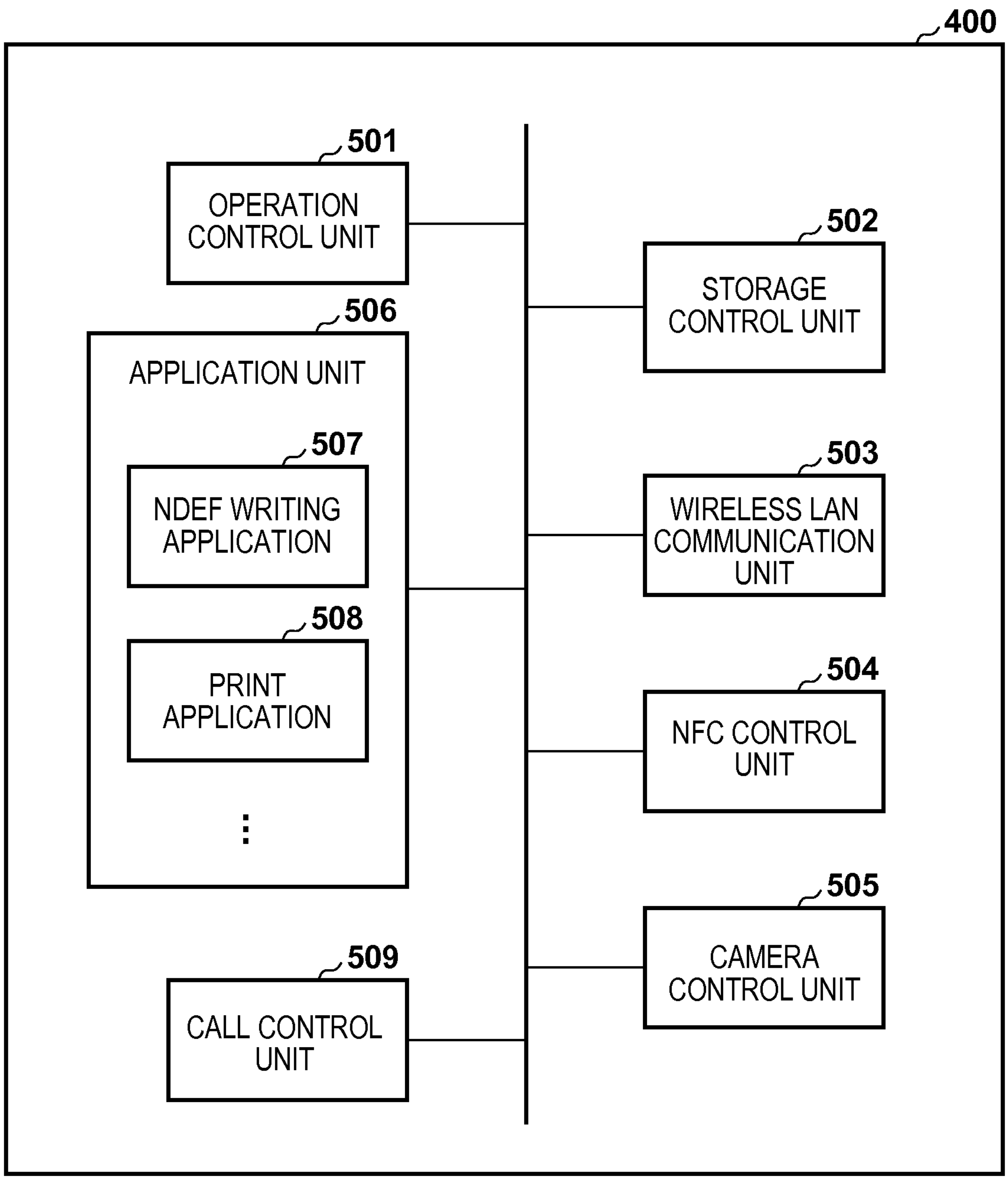
FIG. 5 is a block diagram for showing an example of a software configuration of the communication terminal.

FIG. 5 is a block diagram for showing an example of a software configuration of the communication terminal 400. Each functional unit shown in FIG. 5 is realized on the communication terminal 400 by the CPU 401 reading a control program stored in the ROM 403 or the HDD 404 into the RAM 402 and executing the control program.

An operation control unit 501 controls operation of the operation panel 405. The operation control unit 501 causes operation screens to be displayed on the operation panel 405, and also accepts an input of an instruction by a user via an operation screen displayed on the operation panel 405, for example. The operation control unit 501 notifies another functional unit of an instruction of a user accepted via the operation panel 405, and also updates an operation screen displayed on the operation panel 405 in accordance with the accepted instruction of the user. A storage control unit 502 stores designated data in the RAM 402 or the HDD 404 in accordance with an instruction from another functional unit, or reads designated data from the RAM 402 or the HDD 404.

A wireless LAN communication unit 503 controls a WLAN communication executed by the wireless LAN I/F 406. An NFC control unit 504, by controlling the NFC R/W 407, switches an operation mode of the NFC R/W 407 between a read mode and a write mode. The read mode is an operation mode for performing reading of NDEF data that is written to the NFC tag 600. The write mode is an operation mode for performing writing of NDEF data that is written to the NFC tag 600.

A camera control unit 505, by controlling the camera 408, executes photographing of a moving image or a still image, or instructs the storage control unit 502 to save a moving image or still image obtained by photographing (storage to the RAM 402 or the HDD 404). A call control unit 509 executes audio input and output upon a call by a user by controlling the mic 409 and the speaker 410.

An application (APP) unit 506 is comprised of a plurality of APPS such as an NDEF writing application (APP) 507, a print application (APP) 508, or the like. Note that the APP unit 506 may further include APPS other than the NDEF writing APP 507 and the print APP 508. The NDEF writing APP 507 is a dedicated APP for writing NDEF data to the NFC tag 600. The print APP 508 is an APP for performing communication with the print service 305 on the image forming apparatus 100 via WLAN communication, and transmitting print data by a protocol and a format that the print service 305 supports.

The NDEF writing APP 507 and the print APP 508 are published on a server (not shown) on a network, and for example, are installable on the communication terminal 400 by downloading them from the server via the wireless LAN I/F 406. Alternatively, the NDEF writing APP 507 and the print APP 508 may be installed in advance on the communication terminal 400.

<NFC Tag Configuration>

Figure 6:
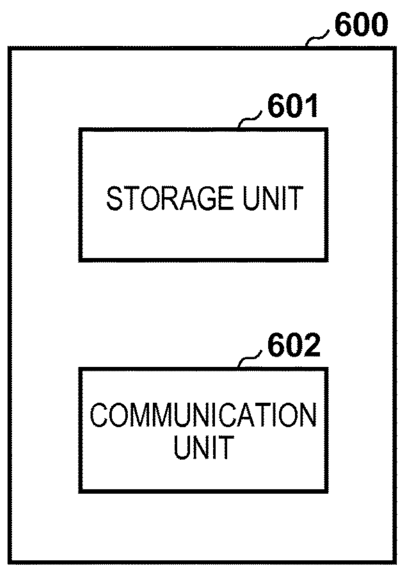
FIG. 6 is a block diagram for showing an example of a hardware configuration of an NFC tag.

FIG. 6 is a block diagram for showing an example of a hardware configuration of the NFC tag 600. The NFC tag 600 includes a storage unit 601 in which NDEF data is stored, and a communication unit 602 for performing NFC communication with an NFC R/W comprised on an external apparatus such as the communication terminal 400 (for example, the NFC R/W 407). The communication unit 602 receives radio waves transmitted from an NFC R/W of an external apparatus by an antenna (not shown), and operates with received radio waves functioning as an energy source (receiving a supply of power by the radio waves). For this reason, the NFC tag 600 itself does not require a power supply such as a battery.

The communication unit 602 transmits NDEF data stored in the storage unit 601 to an NFC R/W in a case where it is detected that the NFC R/W which is set to the read mode is positioned within range of NFC communication of the NFC tag 600. The communication unit 602 receives NDEF data from the NFC R/W and stores the received NDEF data in the storage unit 601 in a case where it is detected that the NFC R/W which is set to the write mode is positioned within range of NFC communication of the NFC tag 600.

Generally, the distance over which an NFC communication is possible is from several cm to 10 cm. For this reason, for example, in a case where a user causes the NFC R/W 407 of the communication terminal 400 to contact (touch) the NFC tag 600, or performs an operation of holding it up to it (approaching it), the NFC R/W 407 is positioned within range of NFC communication of the NFC tag 600. As a consequence, an NFC communication between the NFC R/W 407 and the NFC tag 600 is established, and transmission and reception of NDEF data as described above between the devices is performed.

In the present embodiment, connection information for connecting (wirelessly connecting) to the image forming apparatus 100 by a WLAN scheme from the communication terminal 400 is written as NDEF data to the NFC tag 600. The communication terminal 400, by using the NDEF writing APP 507, writes connection information generated by a later explained method to the NFC tag 600 by NFC communication. The NFC tag 600 provides, by NFC communication, connection information which has been written and held, to an external apparatus that performs reading of the connection information by NFC communication. Note that the NFC tag 600 may provide connection information to other external apparatuses that support NFC, as well as to the communication terminal 400.

<Image Forming Apparatus Display Screen Example>

Figure 7:
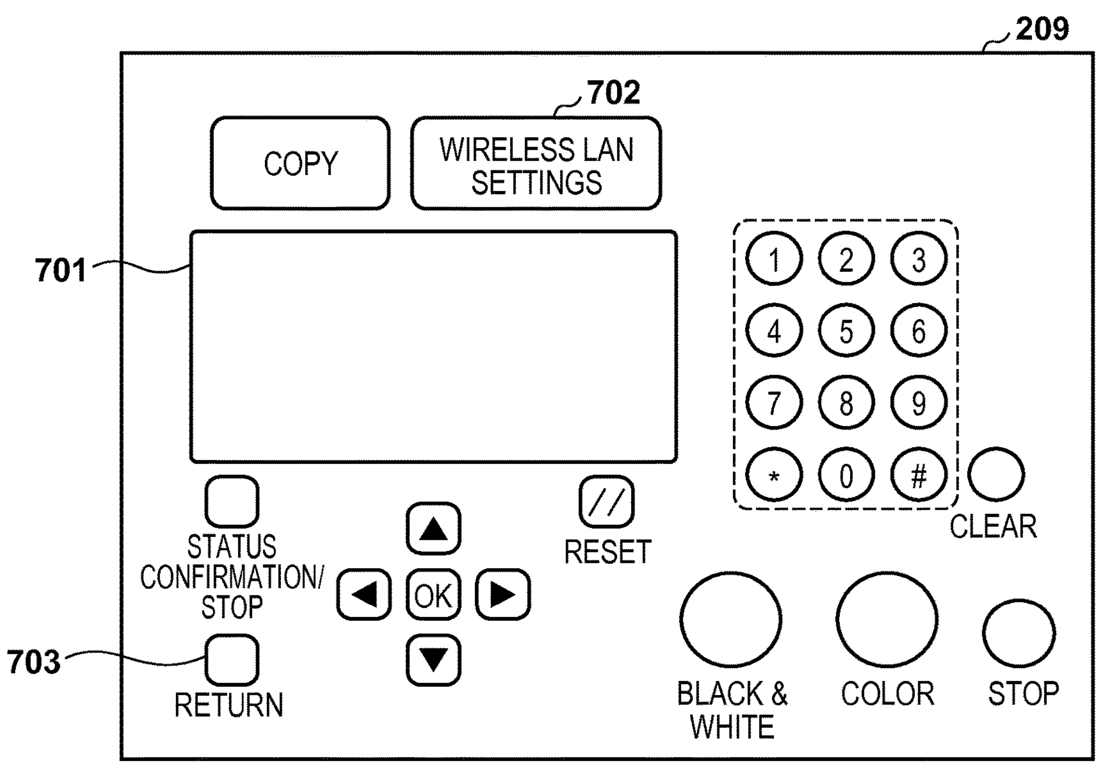
FIG. 7 is a block diagram for showing an example configuration of an operation panel of the image forming apparatus.

FIG. 7 is a view for illustrating an example configuration of the operation panel 209. Various screens are displayed on a display unit 701. For example, there is a screen corresponding to a hardware key or a software key pressed by the user, a screen for the user to perform various settings of the image forming apparatus 100, and a screen for the user to confirm a state of the image forming apparatus 100 (for example, a remaining amount of a toner), or the like.

A key 702 is a button for displaying wireless LAN setting information (wireless setting information) to the display unit 701. When the key 702 is pressed by the user, the operation control unit 301 (the CPU 202) displays a screen indicating wireless LAN setting information (a screen 800 illustrated in FIG. 8) on the display unit 701. A key 703 is a button for completing a display of a screen that is currently displayed on the display unit 701, and returning the display screen of the display unit 701 from the currently displayed screen to a screen displayed immediately before that screen. Note that various keys are arranged on the operation panel 209 in addition to the above keys such as a copy key for using a copy function of the image forming apparatus 100, and arrow keys which are used for the movement of a cursor that is displayed on the display unit 701.

Figure 8:
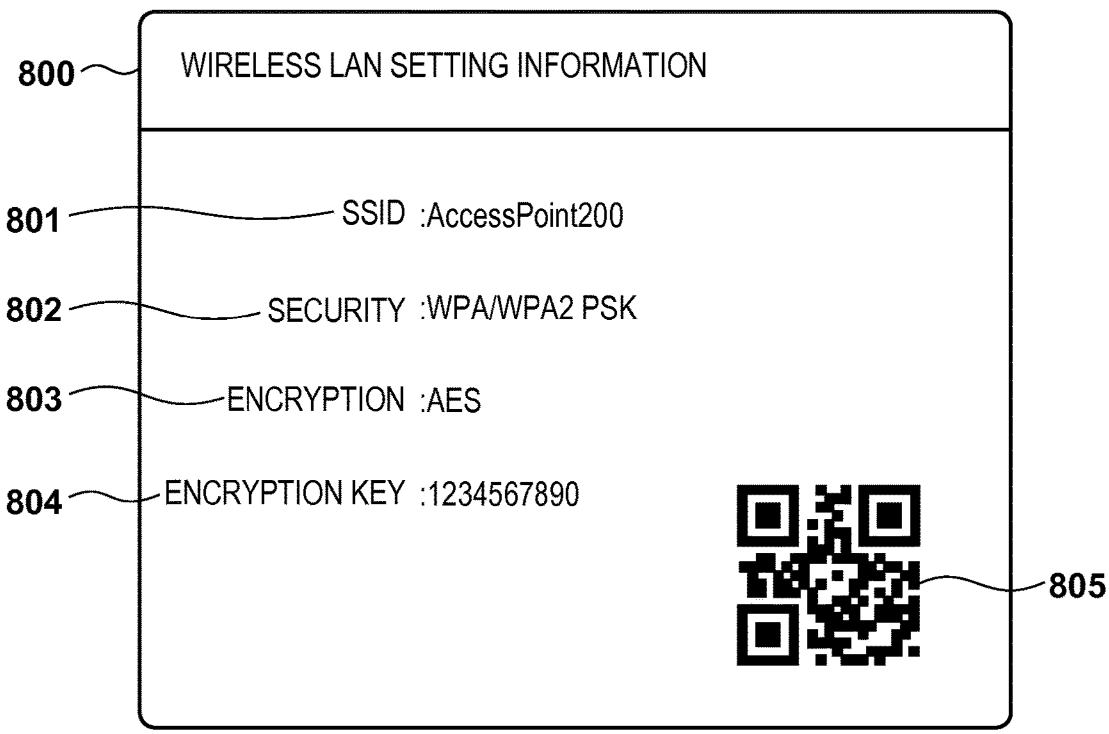
FIG. 8 is a view for showing an example of a screen for indicating wireless LAN setting information in the image forming apparatus.

As described above, when the user presses the key 702, the operation control unit 301 (the CPU 202) displays the screen 800 which includes the wireless LAN setting information as illustrated in FIG. 8 on the display unit 701. In the present embodiment, the wireless LAN setting information corresponds to connection information for connecting to the image forming apparatus 100 by the WLAN scheme. In the screen 800, connection information for wirelessly connecting to the access point 150 to which the image forming apparatus 100 is wirelessly connected as a client by a WLAN scheme is included as wireless LAN setting information. The wireless LAN setting information is set for the image forming apparatus 100 automatically or manually by a user such as a system administrator operating the operation panel 209 of the image forming apparatus 100 in advance. The image forming apparatus 100 establishes a wireless connection to the access point 150 via the wireless LAN I/F 406 using the wireless LAN setting information that is set in advance. An external apparatus such as the communication terminal 400 can connect to the image forming apparatus 100 via the access point 150 by wirelessly connecting to the access point 150 by the WLAN scheme by obtaining the wireless LAN setting information included in the screen 800.

As shown in FIG. 8, an SSID 801, a security scheme 802, an encryption method 803, and an encryption key 804 are included in the wireless LAN setting information. The SSID 801 indicates unique identification information for identifying the access point 150 on the wireless network. The security scheme 802 indicates a security scheme set in advance for the access point 150. The encryption method 803 indicates an encryption method set in advance for the access point 150. The encryption key 804 indicates an encryption key set in advance for the access point 150.

In the present embodiment, as illustrated in FIG. 8, it is assumed that the character string "AccessPoint200" is set as the SSID for the access point 150, and the access point 150 uses "WPA/WPA2 PSK" as the security scheme and AES as the encryption method. It is also assumed that the character string "1234567890" is set as the encryption key for the access point 150. Note that the encryption key may be displayed having replaced the text with another symbol (for example, an asterisk) on the screen 800 in consideration of security.

As is illustrated in FIG. 8, the screen 800 includes an image pattern 805. The image pattern 805 is an image obtained by converting the above described wireless LAN setting information into a corresponding pattern. In the present embodiment, as shown in FIG. 8, the image pattern 805 is comprised of a two-dimensional barcode (for example, a QR Code®). Note that the image pattern 805 is not limited to a two-dimensional barcode, and any pattern can be used.

<Communication Terminal Display Screen Examples>

The communication terminal 400 can execute writing of NDEF data to the NFC tag 600 by the NDEF writing APP 507. When a user instructs activation of the NDEF writing APP 507 by operating the operation panel 405, the CPU 401 activates the NDEF writing APP 507, and starts execution thereof. The NDEF writing APP 507 operates on the communication terminal 400 by being executed by the CPU 401.

FIGS. 9A to 9D are views for showing examples screens that are displayed on the operation panel 405 (NFC Writer screens) by the NDEF writing APP 507. Note that the screens 910, 920, 930, and 940 illustrated in FIGS. 9A to 9D are displayed on the operation panel 405 by the NDEF writing APP 507 instructing the operation control unit 501 to display the screens.

Figure 9A:
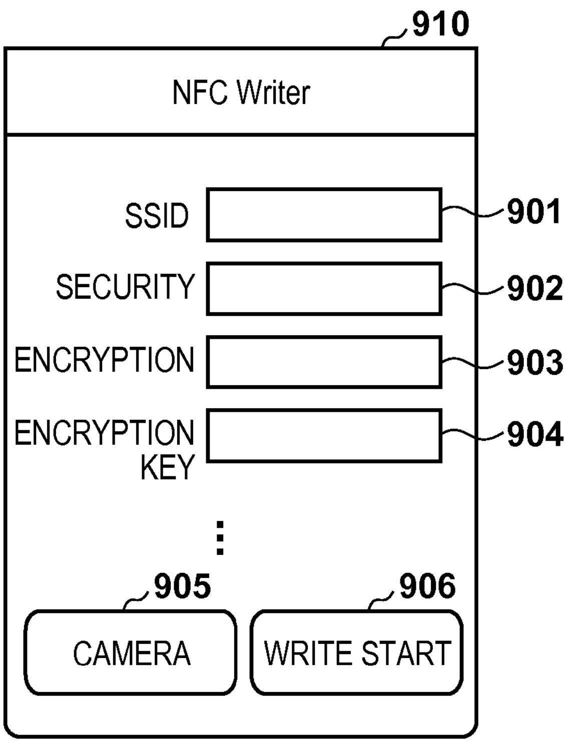
FIGS. 9A to 9D are views for showing examples of screens (NFC Writer screens) which are displayed by an NDEF writing application in the communication terminal.

The screen 910 illustrated in FIG. 9A is an example of a screen displayed on the operation panel 405 when the NDEF writing APP 507 is activated. The screen 910 is used to set information stored in NDEF data written to the NFC tag 600. More specifically, the screen 910 is used to set connection information (wireless LAN setting information) for wirelessly connecting by the WLAN scheme to a specific access point. The specific access point corresponds to an access point that the image forming apparatus 100 connects to as a client by the WLAN scheme, or an access point connected to via a wired network.

The screen 910 includes input fields 901-904 into which the user can input an SSID corresponding to the access point which is a connection target, a security scheme, an encryption method, and an encryption key respectively, and buttons 905 and 906. Note that each input field may be configured by any input format, such as a text format where the user can input a character string, or a list format where the user can select an item from a predetermined list.

Note that in FIG. 9A only input fields for connection information for wirelessly connecting to the access point 150 by the WLAN scheme are illustrated, but input fields by which one can input other information may also be arranged on the screen 910 as information that is stored in the NDEF data. For example, input fields may be arranged for connection information (for example, information such as a MAC address or an IP address of the image forming apparatus 100) for connecting to the image forming apparatus 100 via the access point 150 after a wireless connection is established with the access point 150. Also, input fields for various print settings for transmitting to the image forming apparatus 100 along with print data may be arranged.

A button 905 is a button for activating the camera 408. When the user presses the button 905, the NDEF writing APP 507 activates the camera 408 via the camera control unit 505.

A button 906 is a button for generating NDEF data based on content that is input via the screen 910, and writing the generated NDEF data to the NFC tag 600. When the user presses the button 906, the NDEF writing APP 507 generates NDEF data based on the content that was input via the screen 910. Furthermore, the NDEF writing APP 507, via the NFC control unit 504, in addition to setting the NFC R/W 407 to the write mode, causes the NFC R/W 407 to execute writing of NDEF data to the NFC tag 600.

<NDEF Data Write Processing>

Figure 10:
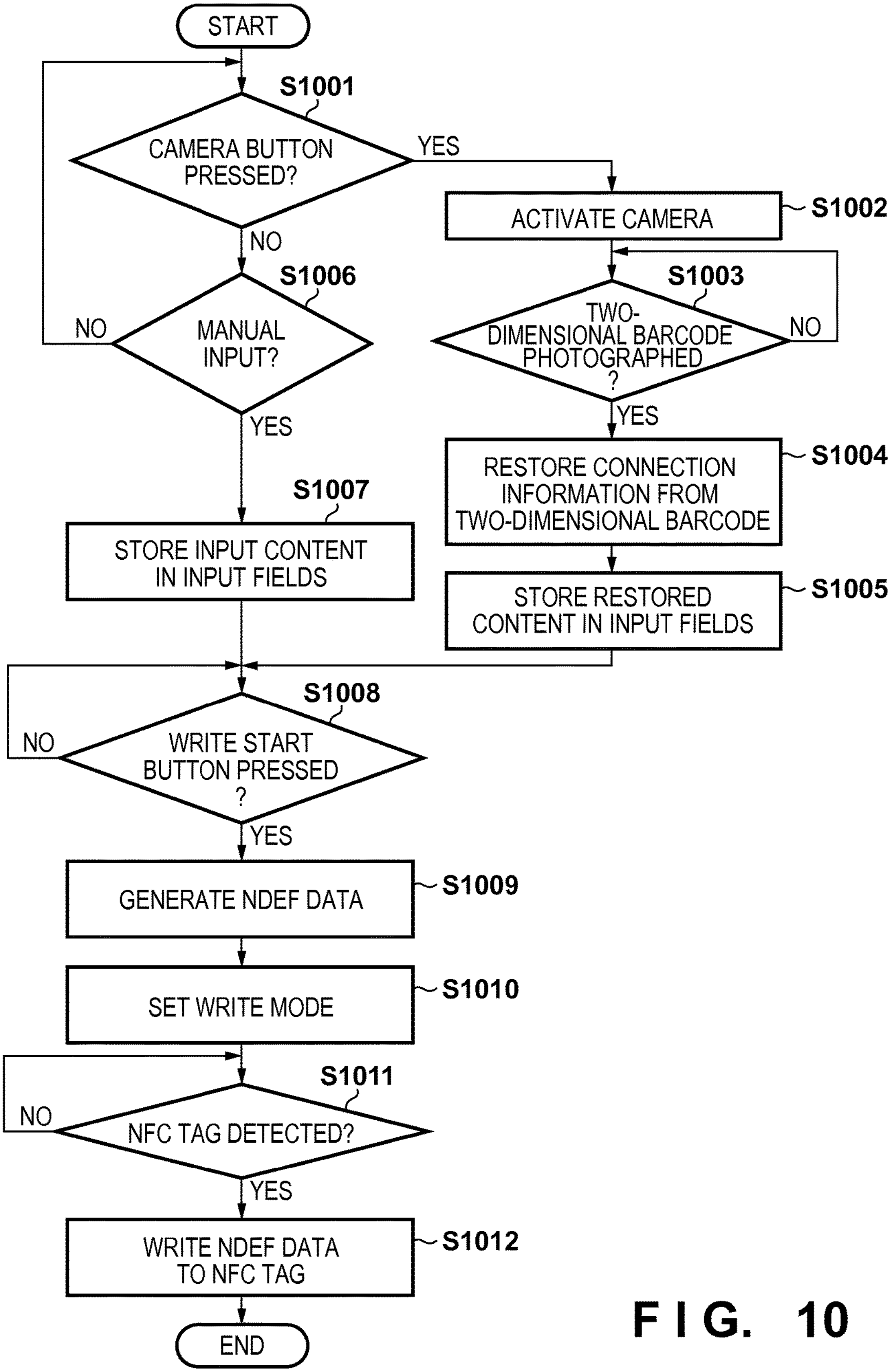
FIG. 10 is a flowchart for illustrating a procedure for processing, executed on the communication terminal, for writing NDEF data to an NFC tag.

FIG. 10 is a flowchart for illustrating a procedure for processing, executed on the communication terminal 400, for writing NDEF data to the NFC tag 600. Processing of each step shown in FIG. 10 is realized, in the communication terminal 400, by the CPU 401 reading and executing a program corresponding to the NDEF writing APP 507 that is stored in the HDD 404 or the ROM 403.

Here, when processing for writing NDEF data using the NDEF writing APP 507 in the communication terminal 400 is started, the screen 800 which is illustrated on FIG. 8 is displayed on the display unit 701 of the image forming apparatus 100. The screen 800 is displayed on the display unit 701 by the user, as described above, pressing the key 702 which is arranged on the operation panel 209 of the image forming apparatus 100. Accordingly, the image pattern 805 converted from the connection information for connecting to the image forming apparatus 100 by the WLAN scheme is displayed in advance on the display unit 701 of the image forming apparatus 100 which is the connecting destination in the communication of the WLAN scheme.

When the NDEF writing APP 507 activates, the screen 910 is displayed on the operation panel 405 of the communication terminal 400. In this state, firstly, in step S1001, the CPU 401 determines whether or not the button 905 of the screen 910 is pressed. The CPU 401 advances the processing to step S1002 when the CPU 401 determines that the button 905 is pressed, and advances the processing to step S1006 when the CPU 401 determines that it is not pressed. In step S1006, the CPU 401 determines whether or not information is input manually by the user in the input fields 901-904 of the screen 910. When the CPU 401 determines that information is not input manually, the CPU 401 returns the processing to step S1001, and when the CPU 401 determines that information is input manually (i.e. the manual input of information is started), the CPU 401 advances the processing to step S1007.

Figure 9B:
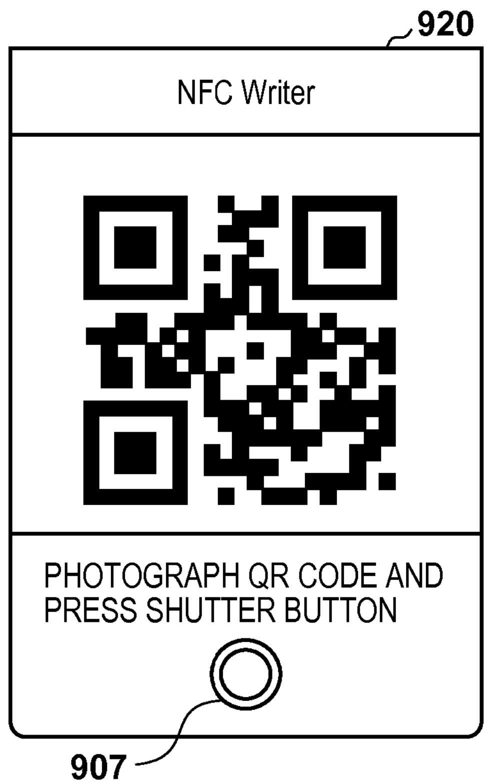

In the case where the processing advances from step S1001 to step S1002, obtainment of connection information from the image pattern 805 is performed using the camera 408. More specifically, in step S1002, the CPU 401 activates the camera 408 via the camera control unit 505. The CPU 401 switches the display screen of the operation panel 405 from the screen 910 to the screen 920 which is shown in FIG. 9B when activating the camera 408. On the screen 920, an image photographed by the camera 408 is displayed. The user can instruct a capture of the image displayed on the screen 920 by pressing a shutter release button 907 within the screen 920. Note that within the screen 920 a message prompting the user to photograph an image pattern 807 by the camera 408 and press the shutter release button 907 is displayed.

In step S1003, the CPU 401 determines whether or not the shutter release button 907 is pressed in a state in which a two-dimensional barcode (the image pattern 805) is photographed, and determines whether or not the capture of the image pattern 805 succeeds. The CPU 401 advances the processing to step S1004 when the shutter release button 907 is pressed in a state in which the two-dimensional barcode (the image pattern 805) is photographed, and the capture of the image pattern 805 is successful.

In step S1004, the CPU 401 restores information prior to the conversion to the image pattern from the image pattern 805 that is captured. With this, the connection information (wireless LAN setting information) illustrated in FIG. 8, which is information prior to a conversion to the image pattern 805, is restored. This connection information, as shown in FIG. 8, includes the SSID 801, the security scheme 802, the encryption method 803, and the encryption key 804.

Figure 9C:
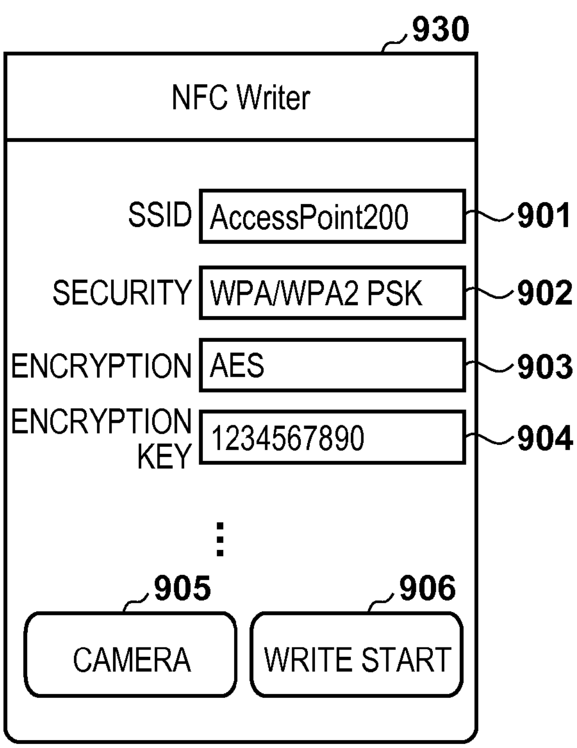

In step S1005, the CPU 401 stores the connection information restored in step S1004 in the corresponding input fields (the input fields 901-904) within the screen 910 automatically. As a consequence, the display screen of the operation panel 405 becomes the screen 930 shown in FIG. 9C. As is illustrated in FIG. 9C, the wireless LAN setting information illustrated in FIG. 8, which is information corresponding to the image pattern 805, is automatically stored in the input fields 901-904 of the screen 930.

Meanwhile, in the case where the processing advances from step S1006 to step S1007, the manual input of the connection information by the user towards the screen 910 is accepted. In step S1007, the CPU 401 stores the content that the user inputs manually using the operation panel 405 into the input fields 901-904 respectively as is. Note that the screen 930 shown in FIG. 9C illustrates a state in which connection information is input by the user in step S1007.

After this, the CPU 401 determines whether or not a write start button (the button 906 of the screen 930) is pressed by the user via the operation panel 405. When it is determined that the write start button is pressed, next, in step S1009, the CPU 401 generates NDEF data based on the information stored in each of the input fields 901-904.

Figure 12:
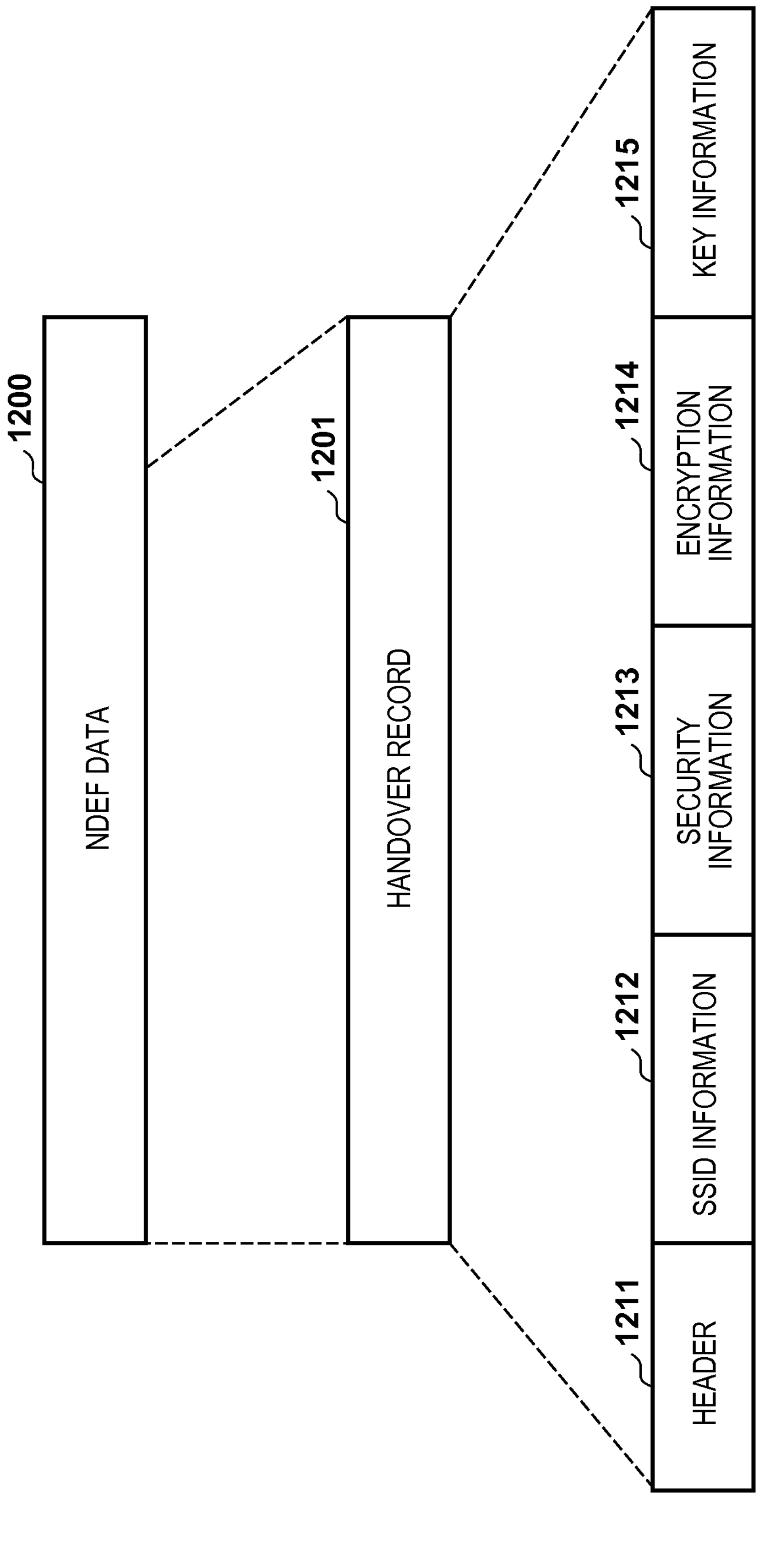
FIG. 12 is a view for illustrating an example configuration of the NDEF data.

NDEF data 1200 shown in FIG. 12 is an example of the NDEF data generated in step S1009. The NDEF data 1200 at least includes a handover record 1201 in which connection information for wirelessly connecting to the access point 150 is stored. The handover record 1201 includes a header 1211, SSID information 1212, security information 1213, encryption information 1214, and key information 1215. In the header 1211, information that indicates that the handover record 1201 is a record in which information for connecting to a wireless master device such as the access point 150 is stored, is stored in a format established in the NFC Forum.

In the SSID information 1212, a character string including an SSID of the wireless master device is stored. In the present embodiment, a character string of "AccessPoint200" which is the SSID of the access point 150 is stored in the SSID information 1212. In the security information 1213, a parameter indicating "WPA/WPA2 PSK" which is a security setting of the access point 150 is stored. In the encryption information 1214, a parameter indicating "AES" which is an encryption setting of the access point 150 is stored. In the key information 1215, a character string of "1234567890" which is an encryption key setting of the access point 150 is stored. Note that in the case where input fields other than the input fields 901-904 are arranged on the screens 910 and 930, the information input into these other input fields is stored in the NDEF data 1200 continuing as another record after the handover record 1201.

Figure 9D:
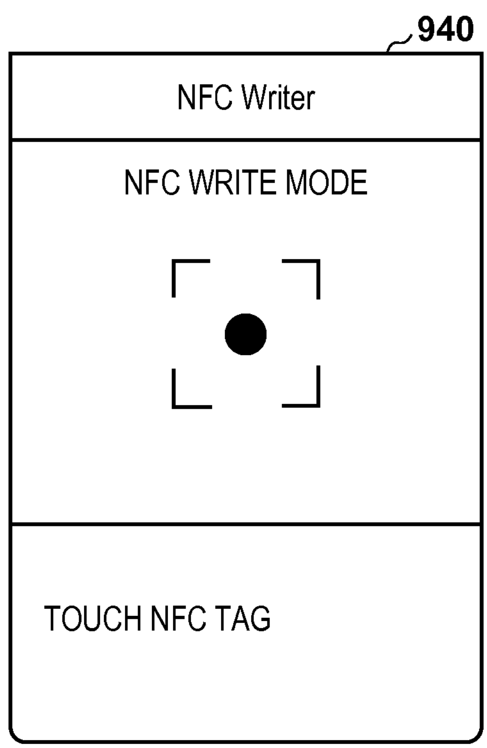

After the generation of the NDEF data, the CPU 401, in step S1010, sets the NFC R/W 407 to the write mode via the NFC control unit 504. At that time, the CPU 401 switches the display screen of the operation panel 405 from the screen 930 to the screen 940 as is illustrated in FIG. 9D. As is illustrated in FIG. 9D, in the screen 930, a message indicating that the NFC R/W 407 is in the write mode, and a message prompting the user to cause the NFC R/W 407 to contact the NFC tag 600 (or to hold it up to it) are included.

After this, the CPU 401, in step S1011, determines whether or not the NFC R/W 407 detects the NFC tag 600 via the NFC control unit 504. By this determination, the CPU 401 waits until the user performs an operation of causing the NFC R/W 407 of the communication terminal 400 to contact the NFC tag 600, or holding it up to it. When the user causes the NFC R/W 407 to contact the NFC tag 600 or holds it up to it, the NFC tag 600 is positioned within range of NFC communication of the NFC R/W 407. When the NFC R/W 407 detects that the NFC tag 600 is positioned within range of NFC communication, and detection information is communicated to the NFC control unit 504 by causing an interrupt to be generated towards the NFC control unit 504. Alternatively, the NFC control unit 504 may continuously poll for a detection of the NFC tag 600 towards the NFC R/W 407, and the NFC R/W 407 may communicate the detection information to the NFC control unit 504 as a response to the polling.

When the NFC R/W 407 detects the NFC tag 600, an NFC communication is established between the NFC R/W 407 and the NFC tag 600. When the CPU 401 determines that the NFC R/W 407 detects the NFC tag 600 via the NFC control unit 504 in step S1011, the processing advances to step S1012. In step S1012, the CPU 401 writes NDEF data generated in step S1007 to the NFC tag 600 by NFC communication. More specifically, the NDEF data is transmitted to the communication unit 602 of the NFC tag 600 from the NFC R/W 407, and is stored in the storage unit 601 by the communication unit 602. By the above, the CPU 401 completes the write processing of the NDEF data towards the NFC tag 600.

<Wireless Connection Processing Based on NDEF Data>

Next, a case in which the NFC tag 600 to which the NDEF data is written by the procedure shown in FIG. 10 is affixed to a surface of the image forming apparatus 100 (an external surface) as shown in FIG. 1 is assumed. In such a case, the communication terminal 400 is able to connect to the image forming apparatus 100 using the NDEF data stored in the NFC tag 600.

More specifically, the communication terminal 400 obtains the NDEF data from the NFC tag 600 by an NFC communication established with the NFC tag 600 by the user causing the NFC R/W 407 of the communication terminal 400 to contact the NFC tag 600 or holding it up to it. Further, the communication terminal 400 performs a handover from the NFC communication to the WLAN communication by wirelessly connecting to the access point 150 by the WLAN scheme based on NDEF data obtained from the NFC tag 600. As a consequence, the communication terminal 400 can transmit print data to the image forming apparatus 100 by a communication via the access point 150 because the communication terminal 400 can connect to the image forming apparatus 100 via the access point 150.

Figure 11:
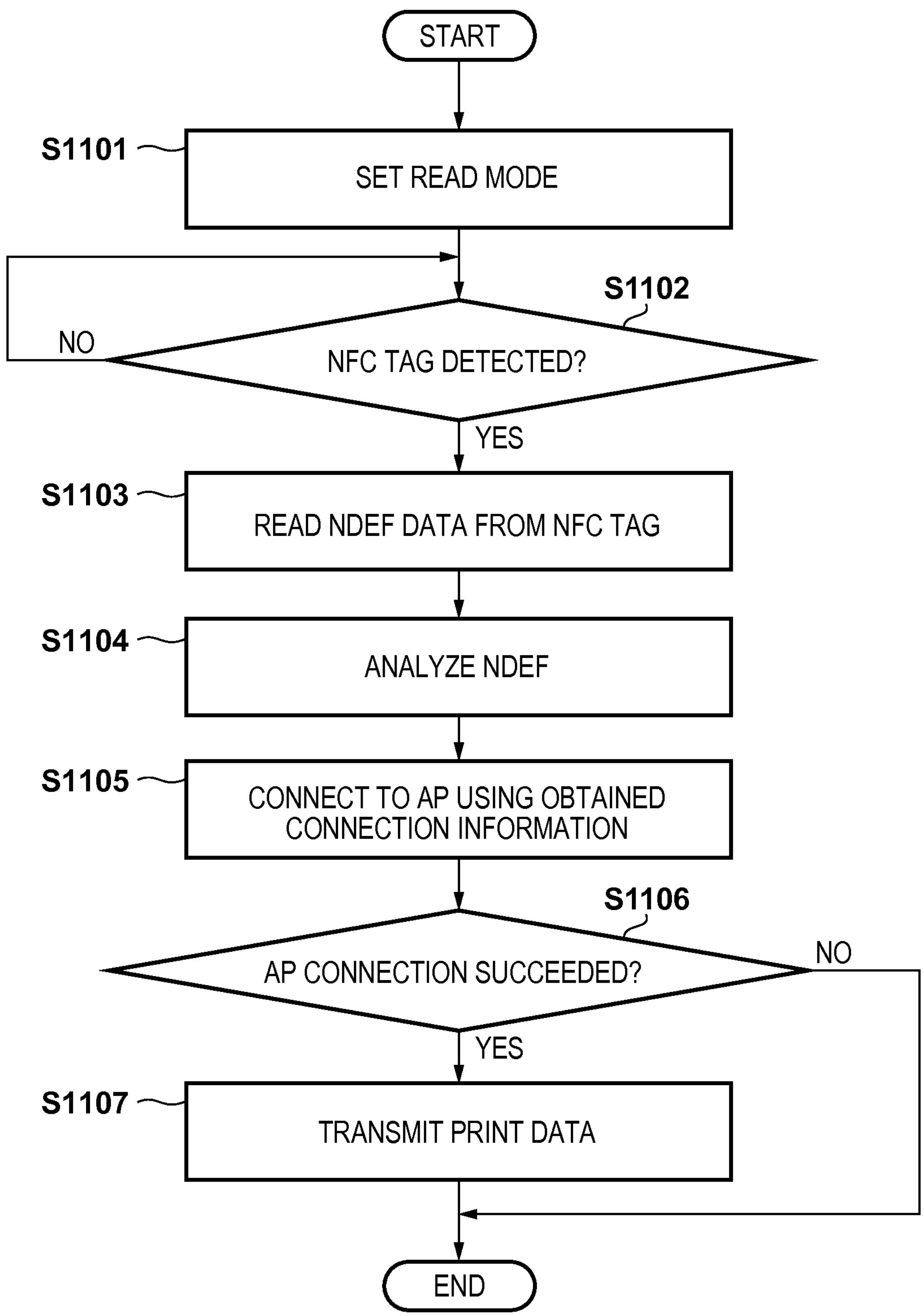
FIG. 11 is a flowchart for illustrating a procedure for wireless connection processing, executed on the communication terminal, which is based on NDEF data obtained by reading from an NFC tag.

FIG. 11 is a flowchart for illustrating a procedure for wireless connection processing, executed on the communication terminal 400, which is based on NDEF data obtained by reading from the NFC tag 600. Processing of each step shown in FIG. 11 is realized, in the communication terminal 400, by the CPU 401 reading and executing a program corresponding to the print APP 508 that is stored in the HDD 404 or the ROM 403. Note that NDEF data is written in advance in the NFC tag 600 by the procedure that is shown in FIG. 10.

When the print APP 508 is activated, firstly the CPU 401, in step S1101, sets the NFC R/W 407 to the read mode via the NFC control unit 504. Next, the CPU 401, in step S1102, determines whether or not the NFC R/W 407 detects the NFC tag 600 via the NFC control unit 504. The CPU 401 waits until it is determined by this determination that the user performs an operation of causing the NFC R/W 407 of the communication terminal 400 to contact the NFC tag 600, or holding it up to the NFC tag 600. When the NFC R/W 407 detects the NFC tag 600, an NFC communication is established between the NFC R/W 407 and the NFC tag 600. When the CPU 401, in step S1102, determines that the NFC R/W 407 detects the NFC tag 600 via the NFC control unit 504, the CPU 401 advances the processing to step S1103.

In step S1103, the CPU 401 reads NDEF data from the NFC tag 600 by the NFC communication. More specifically, NDEF data stored in the storage unit 601 of the NFC tag 600 is transmitted from the communication unit 602 to the NFC R/W 407. The CPU 401 obtains the NDEF data received by the NFC R/W 407 via the NFC control unit 504. Next, in step S1104, the CPU 401 analyzes the obtained NDEF data. With this, the CPU 401 obtains connection information included in the NDEF data which is stored in the input fields 901-904 in the screen 930 shown in FIG. 9C. This connection information corresponds to the SSID 801, the security scheme 802, the encryption method 803, and the encryption key 804 which are information (wireless LAN setting information) included in the screen 800 which is displayed on the display unit 701 in the image forming apparatus 100.

After this, the CPU 401, in step S1105, tries a connection to the access point 150 using the obtained connection information, and determines whether or not a connection to the access point 150 succeeds in step S1106. When the CPU 401 determines that the connection to the access point 150 fails, the processing completes. For example, a case in which the power supply of the access point 150 is stopped, and a case in which a setting of the access point 150 is changed from the setting corresponding to the obtained connection information (for example, a security scheme, an encryption key, or the like) are such cases.

Meanwhile, when the CPU 401 determines that the connection to the access point 150 succeeds in step S1106, the CPU 401 advances the processing to step S1107. In such a case, the communication terminal 400 is in a state in which communication with the image forming apparatus 100 via the access point 150 is possible. Note that in a case where connection information other than the wireless LAN setting information (a MAC address, or an IP address of the image forming apparatus 100) is included in the NDEF data obtained in step S1104, the CPU 401 uses that connection information when establishing communication with the image forming apparatus 100. For example, the image forming apparatus 100 which is the connection target is specified using address information (the IP address, the MAC address, or the like) included in such connection information.

In step S1107, the CPU 401 causes printing to be executed based on print data by the print service 305 by transmitting the print data to the print service 305 of the image forming apparatus 100. Note that the CPU 401 may include print settings in the print data that is transmitted. By the above, the CPU 401 completes the wireless connection processing based on the NDEF data obtained by reading the NFC tag 600.

As explained above, in the present embodiment, the image forming apparatus 100 converts connection information for connecting to the image forming apparatus by the WLAN scheme into the corresponding image pattern 805 and displays it to the display unit 701. The communication terminal 400 photographs the image pattern 805 that is displayed to the display unit 701 by the camera 408. The communication terminal 400 restores the corresponding connection information from the image pattern 805 photographed by the camera 408, and generates NDEF data based on the restored connection information. Furthermore, the communication terminal 400 writes the generated NDEF data to the NFC tag 600 by NFC communication.

With this, it is possible to generate NDEF data automatically based on the photographed image pattern 805 without the user being required to input connection information into the communication terminal 400 manually. Accordingly, it is possible to prevent a user inputting mistake that occurs due to inputting the connection information manually when connection information for connecting to the image forming apparatus 100 is written to the NFC tag 600 from the communication terminal 400. Also, it is possible to eliminate the effort of the user inputting the connection information manually.

Other Embodiments

In above described embodiments, in the present example, the communication terminal 400 executes both the processing for writing the NDEF data to the NFC tag 600 (FIG. 10), and wireless connection processing which is based on NDEF data obtained by reading from the NFC tag 600 (FIG. 11). However, the wireless connection processing shown in FIG. 11 may be executed by a communication terminal supporting NFC and WLAN schemes that is different to the communication terminal 400.

Also, configuration may be taken such that even if the key 702 is pressed in a state in which a wireless connection between the image forming apparatus 100 and the access point 150 is not established, the operation control unit 301 (the CPU 202) controls so to not display the screen 800 (FIG. 8) which indicates the wireless LAN setting information. Thereby, it is possible to prevent the communication terminal 400 generating, and writing to the NFC tag 600, NDEF data based on connection information by which the establishment of communication with the image forming apparatus 100 cannot be realized.

Also, in FIG. 7, an example in which the key 702 is arranged as a hardware key on the operation panel 209 is shown, but this may be realized as a software key included in a screen displayed on the display unit 701. In such a case, the user operates such a software key using a touch panel function of the operation panel 209.

Also, the screen 800 which indicates the wireless LAN setting information (FIG. 8) can be displayed in accordance with various user operations, but it is possible that there are cases in which this is not desirable for reasons of security. In such cases, configuration may be taken such that a system administrator can set to permit or prohibit the display of the screen 800 as a setting of the image forming apparatus 100. Alternatively, configuration may be taken such that it is possible to display the screen 800 only in cases in which the system administrator operates the image forming apparatus 100.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-180493, filed Sep. 4, 2014, which is hereby incorporated by reference herein in its entirety.

What is claimed is:

1. A communication system including a printing apparatus, a mobile terminal, and a Near Field Communication (NFC) tag, wherein the printing apparatus comprises:

a first display that can display information; and a first network interface that can perform network communication, and the mobile terminal comprises:

an image capturing device that can obtain an image;

an NFC device that can perform short-range wireless communication;

a second display that can display information; and a second network interface that can perform network communication, and wherein the printing apparatus causes the first display to display a bar code that is based on connection information available for connecting the first network interface and the second network interface, the mobile terminal reads the bar code by using the image capturing device, the mobile terminal causes, in accordance with reading of the bar code, the second display to display a first screen in which connection information obtained based on the bar code and a specific button for displaying a second screen are arranged, the mobile terminal causes, in accordance with the specific button being selected, the second display to display the second screen, the second screen is a screen for prompting a user to perform an operation of bringing the mobile terminal close to the NFC tag, and the mobile terminal, after the second screen is displayed, transmits information corresponding to the connection information displayed in the first screen to the NFC tag by using the NFC device.

2. The communication system according to claim 1, wherein the connection information includes at least an SSID of an access point.

3. The communication system according to claim 2, wherein the access point is an access point provided by the first network interface.

4. The communication system according to claim 2, wherein the SSID is information for establishing a Wi-Fi direct connection between the printing apparatus and the mobile terminal.

5. The communication system according to claim 2, wherein the connection information further includes a security method and a password of the access point.

6. The communication system according to claim 2, wherein the SSID is set in a field on the first screen in accordance with reading of the bar code.

7. The communication system according to claim 2, wherein a field on the first screen is an input field.

8. The communication system according to claim 1, wherein the bar code is a QR code.

9. The communication system according to claim 1, wherein in a case where the mobile terminal in which the second screen is displayed is positioned within a range sufficient to communicate with the NFC tag, the mobile terminal transmits the information corresponding to the connection information displayed in the first screen to the NFC tag by using the NFC device.

10. The communication system according to claim 1, wherein after the information is stored in the NFC tag, if an external device that includes an NFC device is positioned within a range sufficient to communicate with the NFC tag, the NFC tag transmits the information to the external device.

11. The communication system according to claim 1, wherein the NFC tag is an NFC tag seal, and the NFC tag seal is attached to a housing of the printing apparatus.

12. The communication system according to claim 1, wherein the second screen includes a message to prompt a user to perform an operation of bringing the mobile terminal close to the NFC tag.

13. The communication system according to claim 1, wherein the first screen includes a button for starting to use the image capturing device.

14. The communication system according to claim 1, wherein the first screen is a screen in which the connection information can be manually input.

15. The communication system according to claim 1, wherein a connection established based on the connection information is used for transmission and reception of print data.

16. A mobile terminal that can communicate with a printing apparatus comprising a first display, a first network interface and a Near Field Communication (NFC) tag, the mobile terminal comprising:

an image capturing device that can obtain an image;

an NFC device that can perform short-range wireless communication;

a second display that can display information;

a second network interface that can perform network communication; and at least one or more controllers configured to function as:

a unit that that reads a bar code displayed on the first display by using the image capturing device, the bar code being based on connection information available for connecting the first network interface and the second network interface;

a unit that causes, in accordance with reading of the bar code, the second display to display a first screen in which connection information obtained based on the bar code and a specific button for displaying a second screen are arranged;

a unit that causes, in accordance with the specific button being selected, the second display to display the second screen, the second screen is a screen for prompting a user to perform an operation of bringing the mobile terminal close to the NFC tag; and a unit that transmits, after the second screen is displayed, transmits information corresponding to the connection information displayed in the first screen to the NFC tag by using the NFC device.

17. A control method for a mobile terminal that can communicate with a printing apparatus comprising a first display, a first network interface and a Near Field Communication (NFC) tag, the mobile terminal comprising an image capturing device that can obtain an image, an NFC device that can perform short-range wireless communication, a second display that can display information, and a second network interface that can perform network communication, the control method comprising:

reading a bar code displayed on the first display by using the image capturing device, the bar code being based on connection information available for connecting the first network interface and the second network interface;

causing, in accordance with reading of the bar code, the second display to display a first screen in which connection information obtained based on the bar code and a specific button for displaying a second screen are arranged;

causing in accordance with the specific button being selected, the second display to display the second screen, the second screen is a screen for prompting a user to perform an operation of bringing the mobile terminal close to the NFC tag; and transmitting, after the second screen is displayed, transmits information corresponding to the connection information displayed in the first screen to the NFC tag by using the NFC device.

18. A non-transitory computer-readable storage medium storing a program for causing a computer to execute a control method for a mobile terminal that can communicate with a printing apparatus comprising a first display, a first network interface and a Near Field Communication (NFC) tag, the mobile terminal comprising an image capturing device that can obtain an image, an NFC device that can perform short-range wireless communication, a second display that can display information, and a second network interface that can perform network communication, the control method comprising:

reading a bar code displayed on the first display by using the image capturing device, the bar code being based on connection information available for connecting the first network interface and the second network interface;

causing, in accordance with reading of the bar code, the second display to display a first screen in which connection information obtained based on the bar code and a specific button for displaying a second screen are arranged;

causing in accordance with the specific button being selected, the second display to display the second screen, the second screen is a screen for prompting a user to perform an operation of bringing the mobile terminal close to the NFC tag; and transmitting, after the second screen is displayed, transmits information corresponding to the connection information displayed in the first screen to the NFC tag by using the NFC device.

19. The storage medium according to claim 18, wherein the connection information includes at least an SSID of an access point.

20. The storage medium according to claim 19, wherein the access point is an access point provided by the first network interface.

21. The storage medium according to claim 19, wherein the SSID is information for establishing an Wi-Fi direct connection between the printing apparatus and the mobile terminal.

22. The storage medium according to claim 19, wherein the connection information further includes a security method and a password of the access point.

23. The storage medium according to claim 19, wherein the SSID is set in a field on the first screen in accordance with reading of the bar code.

24. The storage medium according to claim 19, wherein a field on the first screen is an input field.

25. The storage medium according to claim 18, wherein the bar code is QR code.

26. The storage medium according to claim 18, wherein in a case where the mobile terminal in which the second screen is displayed is positioned within a range sufficient to communicate with the NFC tag, the mobile terminal transmits the information corresponding to the connection information displayed in the first screen to the NFC tag by using the NFC device.

27. The storage medium according to claim 18, wherein after the information is stored in the NFC tag, if an external device that includes an NFC device is positioned within a range sufficient to communicate with the NFC tag, the NFC tag transmits the information to the external device.

28. The storage medium according to claim 18, wherein the NFC tag is an NFC tag seal, and the NFC tag seal is attached to a housing of the printing apparatus.

29. The storage medium according to claim 18, wherein the second screen includes a message to prompt a user to perform an operation of bringing the mobile terminal close to the NFC tag.

30. The storage medium according to claim 18, wherein the first screen includes a button for starting to use the image capturing device.

31. The storage medium according to claim 18, wherein the first screen is a screen in which the connection information can be manually input.

32. The storage medium according to claim 18, wherein a connection established based on the connection information is used for transmission and reception of print data.

* * * * *